US012151368B2

(12) United States Patent
Kanda et al.

(10) Patent No.: US 12,151,368 B2
(45) Date of Patent: Nov. 26, 2024

(54) AIR CHUCK

(71) Applicant: SMC CORPORATION, Chiyoda-ku (JP)

(72) Inventors: Kouichirou Kanda, Tsukuba (JP); Koji Hara, Tsukubamirai (JP); Tsuyoshi Sasaki, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 411 days.

(21) Appl. No.: 17/634,125

(22) PCT Filed: Aug. 7, 2020

(86) PCT No.: PCT/JP2020/030328
§ 371 (c)(1),
(2) Date: Feb. 9, 2022

(87) PCT Pub. No.: WO2021/033577
PCT Pub. Date: Feb. 25, 2021

(65) Prior Publication Data
US 2022/0314463 A1 Oct. 6, 2022

(30) Foreign Application Priority Data
Aug. 21, 2019 (JP) .................................. 2019-151556

(51) Int. Cl.
*B25J 15/08* (2006.01)
*B23B 31/16* (2006.01)
(Continued)

(52) U.S. Cl.
CPC ....... *B25J 15/083* (2013.01); *B23B 31/16104* (2013.01); *B25J 15/0253* (2013.01);
(Continued)

(58) Field of Classification Search
CPC .... B25J 15/083; B25J 15/0253; B25J 15/026; B25J 15/086; B25J 15/04; B25J 9/1035;
(Continued)

(56) References Cited

U.S. PATENT DOCUMENTS

| 5,871,250 A * | 2/1999 | Sawdon | ............... B25J 15/0253 |
|---|---|---|---|
| | | | 901/46 |
| 6,547,258 B2 * | 4/2003 | Mandokoro | ............... B25B 1/18 |
| | | | 269/95 |

(Continued)

FOREIGN PATENT DOCUMENTS

| DE | 3428152 A * | 2/1986 | .......... B25J 15/0253 |
|---|---|---|---|
| DE | 10 2008 020 489 A1 | 10/2009 | |

(Continued)

OTHER PUBLICATIONS

International Search Report mailed on Nov. 2, 2020 in PCT/JP2020/030328 filed on Aug. 7, 2020 (2 pages).
Japanese Office Action issued Mar. 7, 2023, in Japanese Patent Application No. 2019-151556, (with English translation), 6 pages.
Extended European Search Report issued Aug. 7, 2023, in European Application No. 20854794.3, 7 pages.

*Primary Examiner* — Eric A. Gates
*Assistant Examiner* — Reinaldo A Del Vargas Rio
(74) *Attorney, Agent, or Firm* — Oblon, McClelland, Maier & Neustadt, L.L.P.

(57) ABSTRACT

An air chuck includes a chuck unit including a pair of fingers that capable of being freely opened and closed, an operation unit that includes an operation mechanism, which opens and closes the pair of fingers, connection mechanisms for attaching the chuck unit to the operation unit such that the chuck unit is freely attachable and detachable to and from the operating unit, and a locking mechanism that locks the pair of fingers such that the pair of fingers are capable of being freely opened and closed when the chuck unit is attached to (Continued)

the operation unit and such that the pair of fingers are not able to be opened or closed when the chuck unit is detached from the operation unit.

9 Claims, 11 Drawing Sheets

(51) Int. Cl.
  *B25J 15/02* (2006.01)
  *B25J 15/04* (2006.01)
(52) U.S. Cl.
  CPC .......... *B25J 15/026* (2013.01); *B25J 15/086* (2013.01); *B23B 2270/027* (2013.01); *B25J 15/04* (2013.01); *Y10T 279/1224* (2015.01); *Y10T 279/1946* (2015.01)
(58) Field of Classification Search
  CPC ......... B23B 31/16104; B23B 2270/027; Y10T 279/1224; Y10T 279/1946
  See application file for complete search history.

(56) References Cited

U.S. PATENT DOCUMENTS

| | | | |
|---|---|---|---|
| 10,189,093 B2 * | 1/2019 | Saito | B23B 31/30 |
| 2018/0272543 A1 | 9/2018 | Kayama et al. | |
| 2019/0111575 A1 | 4/2019 | Asano et al. | |
| 2022/0016789 A1 | 1/2022 | Asano et al. | |

FOREIGN PATENT DOCUMENTS

| | | |
|---|---|---|
| EP | 0 208 863 B1 | 10/1988 |
| JP | 4-41190 A | 2/1992 |
| JP | 4-289090 A | 10/1992 |
| JP | 5-69363 A | 3/1993 |
| JP | 7-290392 A | 11/1995 |
| JP | 8-25266 A | 1/1996 |
| JP | 2013-91121 A | 5/2013 |
| JP | 2018-158405 A | 10/2018 |

* cited by examiner

AIR CHUCK

TECHNICAL FIELD

The present invention relates to an air chuck including a pair of fingers that are capable of being freely opened and closed, and more particularly to an air chuck in which a chuck unit that includes the pair of fingers is freely attachable and detachable to and from an operation unit that opens and closes the fingers.

BACKGROUND ART

An air chuck in which a chuck unit including a pair of fingers that are capable of being freely opened and closed and an operation unit including an operation mechanism that opens and closes the pair of fingers are freely attachable and detachable to and from each other is commonly known as disclosed in, for example, Patent Literatures PTL 1 to PTL 3. This type of air chuck can handle a wide variety of workpieces by replacing the chuck unit in accordance with the type of a workpiece and thus is efficient and economical.

In a commonly known air chuck, however, when the chuck unit is detached from the operation unit, the pair of fingers are brought into a free state, and thus, the pair of fingers are freely displaced, so that a fixed positional relationship cannot be maintained. Thus, when the chuck unit is attached to the operation unit, it is necessary to accurately adjust the positions of the pair of fingers with respect to the position of an operation mechanism (e.g., a piston) that is built into the operation unit. In particular, in the case of automatically replacing the chuck unit by using a robot or the like, it is necessary to prepare a mechanism that adjusts the positions of the pair of fingers with respect to the operation mechanism, a mechanism that maintains the pair of fingers in a state after being adjusted, or the like.

CITATION LIST

Patent Literature

PTL 1: Japanese Unexamined Patent Application Publication No. 4-41190
PTL 2: Japanese Unexamined Patent Application Publication No. 4-289090
PTL 3: Japanese Unexamined Patent Application Publication No. 7-290392

SUMMARY OF INVENTION

Technical Problem

It is a technical object of the present invention to maintain, in an air chuck in which a chuck unit including a pair of fingers is freely attachable and detachable to and from an operation unit, a fixed positional relationship between the pair of fingers by preventing the fingers from being freely displaced when the chuck unit is detached from the operation unit.

Solution to Problem

To solve the problem, an air chuck according to the present invention includes a chuck unit including a pair of fingers that are capable of being freely opened and closed, an operation unit including an operation mechanism that opens and closes the pair of fingers, at least one connection mechanism for attaching the chuck unit to the operation unit such that the chuck unit is freely attachable and detachable to and from the operating unit, and at least one locking mechanism that locks the pair of fingers such that the pair of fingers are capable of being freely opened and closed when the chuck unit is attached to the operation unit and such that the pair of fingers are not able to be opened or closed when the chuck unit is detached from the operation unit.

In the present invention, the locking mechanism may include a plunger, a locking spring, and an engagement member. The plunger may be displaced to a locking position by being pushed by the locking spring when the chuck unit is detached from the operation unit and may be displaced to a non-locking position by being pushed by the operation unit when the chuck unit is attached to the operation unit. When the plunger is displaced to the locking position, the engagement member may be pushed by the plunger and may engage with the pair of fingers so as to lock the pair of fingers, and when the plunger is displaced to the non-locking position, the engagement member may be released from a pressing force applied by the plunger and may bring the pair of fingers into a non-locking state.

In this case, the chuck unit may include a support member that supports the pair of fingers, and the plunger and the locking spring may be accommodated in an accommodating hole that is formed in the support member. A retaining hole may be formed in a hole wall of the accommodating hole in such a manner as to be open to at least one of side surfaces of the support member, and the engagement member that has a spherical shape may be accommodated in the retaining hole in such a manner as to be capable of being freely displaced between an engagement position at which the engagement member engages with the fingers and a non-engagement position at which the engagement member does not engage with the fingers. The plunger may have a tapered surface, and the tapered surface may push the engagement member so as to displace the engagement member to the engagement position when the plunger is displaced to the locking position and may move away from the engagement member such that the engagement member becomes capable of being freely displaced to the non-engagement position when the plunger is displaced to the non-locking position.

In addition, it is preferable that one of the pair of fingers and another one of the pair of fingers respectively include an arm extending along one of the side surfaces of the support member and an arm extending along another one of the side surfaces of the support member, and it is preferable that the arm of the one finger and the arm of the other finger each have an engagement recess with which the engagement member engages at the engagement position.

In the present invention, the locking mechanism may be disposed on the support member, and the locking mechanism may include a pair of engagement members one of which engages with one of the fingers and another one of which engages with another one of the fingers.

Alternatively, a plurality of the locking mechanisms may be arranged on the support member, and one of the locking mechanisms may lock one of the fingers and another one of the locking mechanisms may lock another one of the fingers.

In the present invention, it is desirable that the locking mechanism lock the pair of fingers in full open positions or full closed positions.

In addition, in the present invention, a plurality of the connection mechanisms may be provided such that one of the connection mechanisms connects a first end of the chuck unit and a first end of the operation unit to each other and such that another one of the connection mechanisms connects a second end of the chuck unit and a second end of the operation unit to each other. Each of the connection mechanisms may include a connection hook that is provided in such a manner as to be fixed to an end portion of the chuck unit, a connection pin that is provided in an end portion of the operation unit so as to be capable of being freely displaced and that engages and disengages with and from the connection hook, and a pin operating mechanism that operates the connection pin. Each of the pin operating mechanisms may include a connection piston that holds the connection pin, a separation pressure chamber for moving the connection piston in a direction in which the connection pin disengages from the connection hook, a separation port that communicates with the separation pressure chamber, and a connection spring for moving the connection piston in a direction in which the connection pin engages with the connection hook.

In this case, it is desirable that each of the pin operating mechanisms include two connection pistons that are arranged side by side, and it is desirable that a first end and a second end of the connection pin be supported by the two connection pistons.

Advantageous Effects of Invention

According to the present invention, when a chuck unit is detached from an operation unit, a pair of fingers are locked in fixed positions by a locking mechanism, and thus, attachment and detachment of the chuck unit and replacement of the chuck unit can be easily performed. In particular, in the case of automatically replacing the chuck unit by using a robot or the like, it is not necessary to adjust the positions of the pair of fingers in accordance with an operation mechanism, and thus, a mechanism for such an adjustment, a mechanism for maintaining the fingers in a state after being adjusted, or the like does not need to be provided.

DESCRIPTION OF EMBODIMENTS

Figure 1:
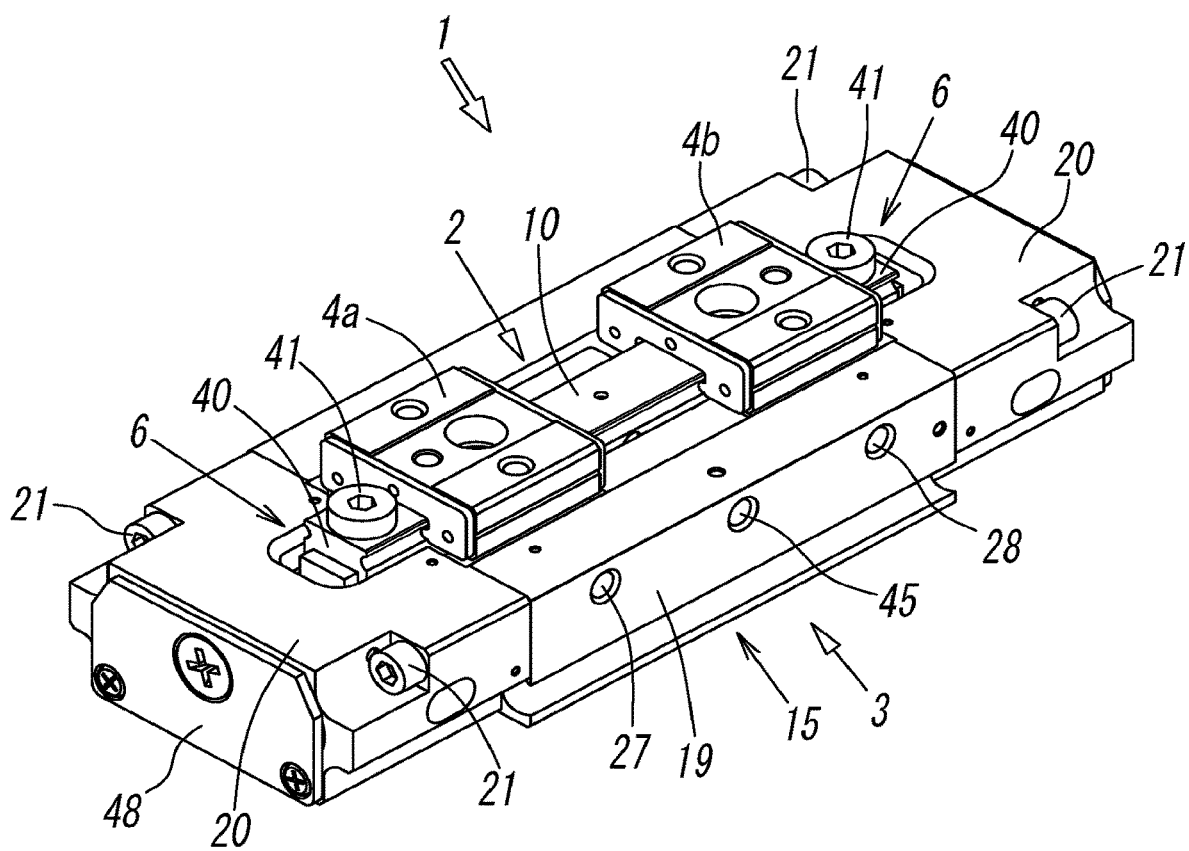
FIG. 1 is a perspective view of an air chuck according to a first embodiment of the present invention.

FIG. 1 to FIG. 11 illustrate an air chuck according to the first embodiment of the present invention. An air chuck 1 includes a chuck unit 2 including a pair of fingers 4a and 4b that are capable of being freely opened and closed so as to chuck a workpiece, an operation unit 3 including an operation mechanism 5 that opens and closes the pair of fingers 4a and 4b, connection mechanisms 6 and 6 that connect the chuck unit 2 and the operating unit 3 to each other such that the chuck unit 2 is freely attachable and detachable to and from the operating unit 3, and a locking mechanism 7 that locks the pair of fingers 4a and 4b such that the pair of fingers 4a and 4b are not able to be opened or closed when the chuck unit 2 is detached from the operation unit 3.

As illustrated in FIG. 1 to FIG. 5, the chuck unit 2 includes a linearly elongated bar-shaped support member 10, and the top surface of the support member 10 serves as a rail portion 10a. The pair of fingers 4a and 4b straddle the rail portion 10a and are supported on the rail portion 10a so as to be freely movable along the rail portion 10a.

Figure 2:
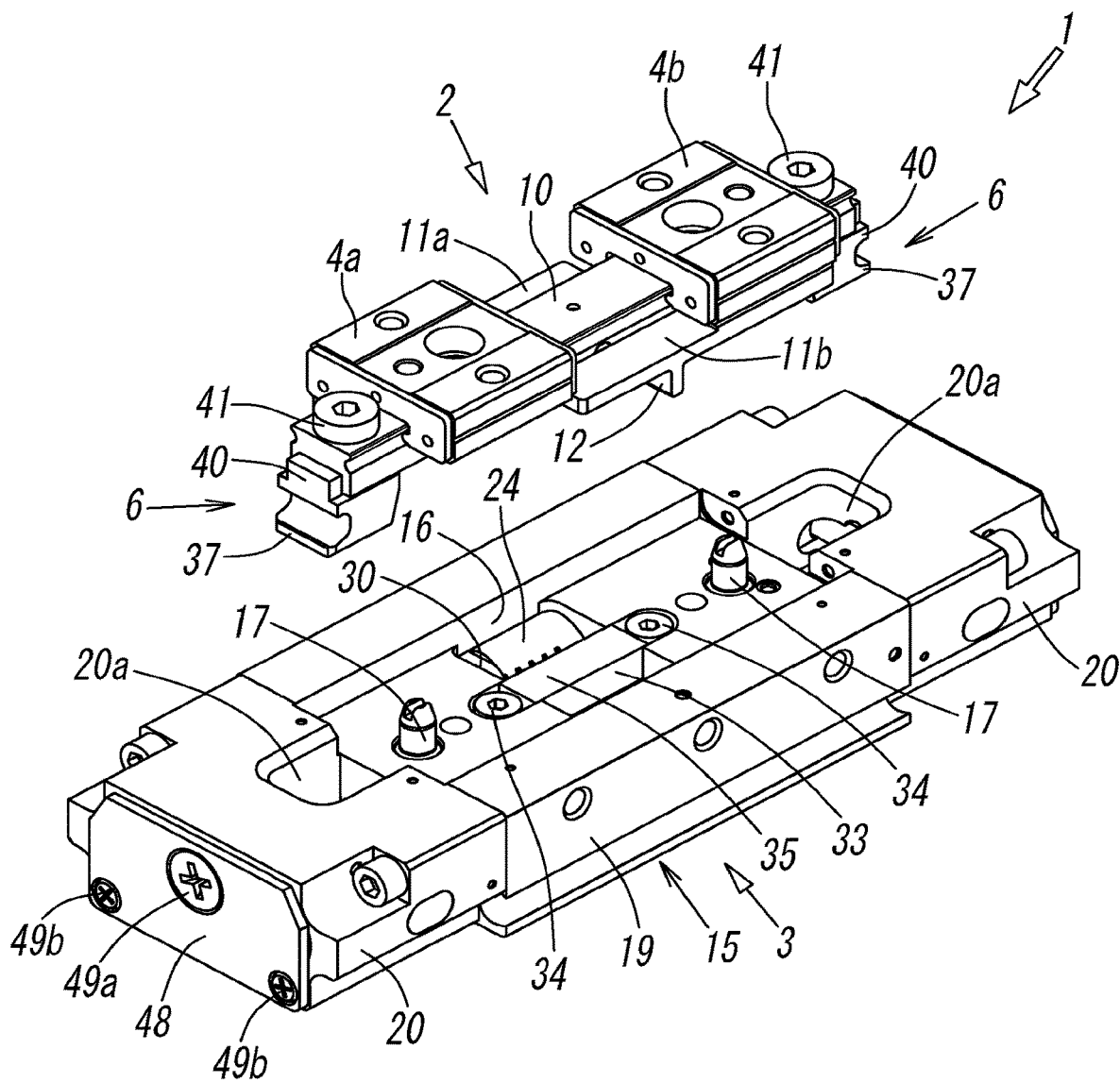
FIG. 2 is a perspective view of the air chuck in a state where a chuck unit has been detached from an operation unit.
Figure 3:
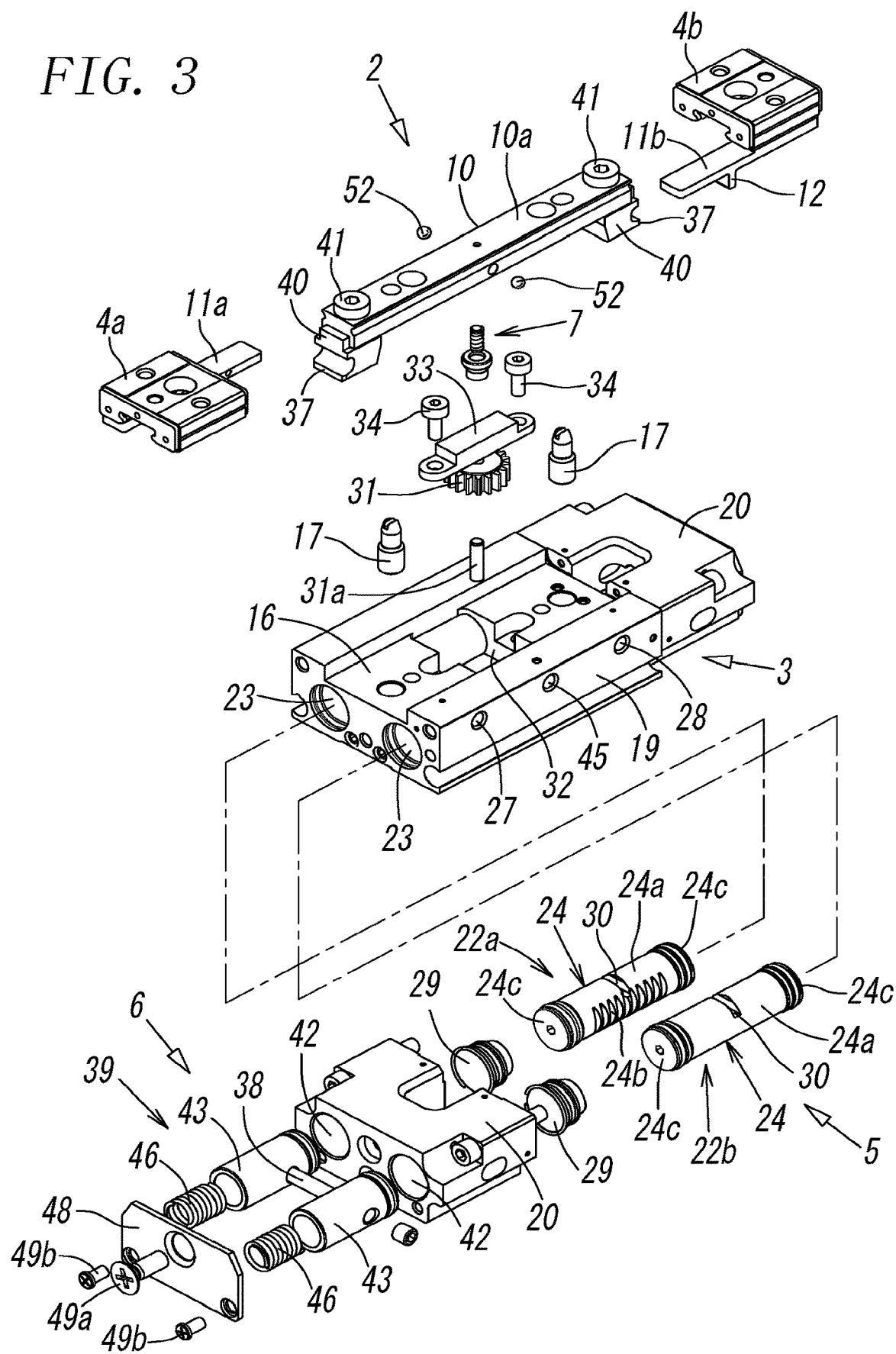
FIG. 3 is a perspective view illustrating the air chuck in an exploded manner.

Note that, in the following description, the terms "upward" and "downward" refer to directions in FIG. 1 to FIG. 3 and do not relate to a direction in which the air chuck 1 is used.

The pair of fingers 4a and 4b each have a rectangular shape when viewed in plan view, and attachments (not illustrated) can be attached to the pair of fingers 4a and 4b so that a workpiece is clamped between the attachments.

The pair of fingers 4a and 4b include arms 11a and 11b, respectively, and the arms 11a and 11b are used for connecting the pair of fingers 4a and 4b to the operation mechanism 5, which is built in the operation unit 3. In other words, the first finger 4a includes a bar-shaped first arm 11a that extends along one of the side surfaces of the support member 10, and the second finger 4b includes a bar-shaped second arm 11b that extends along the other of the side surfaces of the support member 10. Engagement protrusions 12 are formed on the bottom surfaces (surfaces facing toward the operation unit 3) of the first and second arms 11a and 11b, and each of these engagement protrusions 12 engages with one of engagement grooves 30 and 30 that are formed in a pair of operation pistons 24 and 24 of the operation mechanism 5. The first finger 4a is operated by one of the operation pistons 24 so as to move, and the second finger 4b is operated by the other of the operation pistons 24 so as to move.

Note that, in the following description, when there is no need to distinguish the first finger 4a and the second finger 4b from each other, they will be simply referred to as "fingers 4a and 4b", and when there is no need to distinguish the first arm 11a and the second arm 11b from each other, they will be simply referred to as "arms 11a and 11b". Similarly, a first cylinder device 22a and a second cylinder device 22b, which will be described later, will be simply referred to as "cylinder devices 22a and 22b" when there is no need to distinguish them.

Next, the operation unit 3 will be described. The operation unit 3 includes a chuck body 15 having a substantially rectangular shape that is elongated in opening and closing directions of the fingers 4a and 4b. A recess 16 is formed in the top surface of the chuck body 15. The chuck unit 2 is accommodated in the recess 16 in such a manner as to be removable therefrom by being moved upward as illustrated in FIG. 2 and connected to the chuck body 15 by the two connection mechanisms 6 and 6. In addition, two positioning pins 17 are arranged on the top surface of the chuck body 15, and each of the positioning pins 17 is fitted into one of two positioning holes 18 that are formed in the support member 10 of the chuck unit 2, so that the chuck unit 2 and the chuck body 15 are connected to each other while positioned with respect to each other.

The chuck body 15 includes a main body 19 that is located at the center thereof and two auxiliary bodies 20 and 20 that are connected to the two ends of the main body 19 in the lengthwise direction of the main body 19 by bolts 21. The two cylinder devices 22a and 22b included in the operation mechanism 5, that is, the first cylinder device 22a and the second cylinder device 22b, are accommodated in the main body 19, and each of the two connection mechanisms 6 and 6 is partially accommodated in one of the two auxiliary bodies 20 and 20.

The two cylinder devices 22a and 22b are arranged in the main body 19 so as to be parallel to each other. The two cylinder devices 22a and 22b have the same configuration and are configured to operate synchronously with each other in opposite directions.

In other words, the cylinder devices 22a and 22b have cylinder holes 23 each of which extends in the main body 19 in the opening and closing directions of the fingers 4a and 4b and include the operation pistons 24 each of which has a round bar shape and each of which is slidably accommodated in one of the cylinder holes 23. In addition, the cylinder devices 22a and 22b have first pressure chambers 25 that are formed in the operation pistons 24 such that each of the first pressure chambers 25 is located on a first end side of the corresponding operation piston 24, and second pressure chambers 26 that are formed in the operation pistons 24 such that each of the second pressure chambers 26 is located on a second end side of the corresponding operation piston 24. Furthermore, the cylinder devices 22a and 22b have first and second ports 27 and 28 that are formed in a side surface of the main body 19. The first port 27 communicates with the first pressure chambers 25 through a communication hole (not illustrated) that is formed in the main body 19, and the second port 28 communicates with the second pressure chambers 26 through another communication hole (not illustrated) that is formed in the main body 19.

The arrangement of the first pressure chamber 25 and the second pressure chamber 26 with respect to the operation piston 24 of the first cylinder device 22a is opposite to the arrangement of the first pressure chamber 25 and the second pressure chamber 26 with respect to the operation piston 24 of the second cylinder device 22b.

Figure 5:
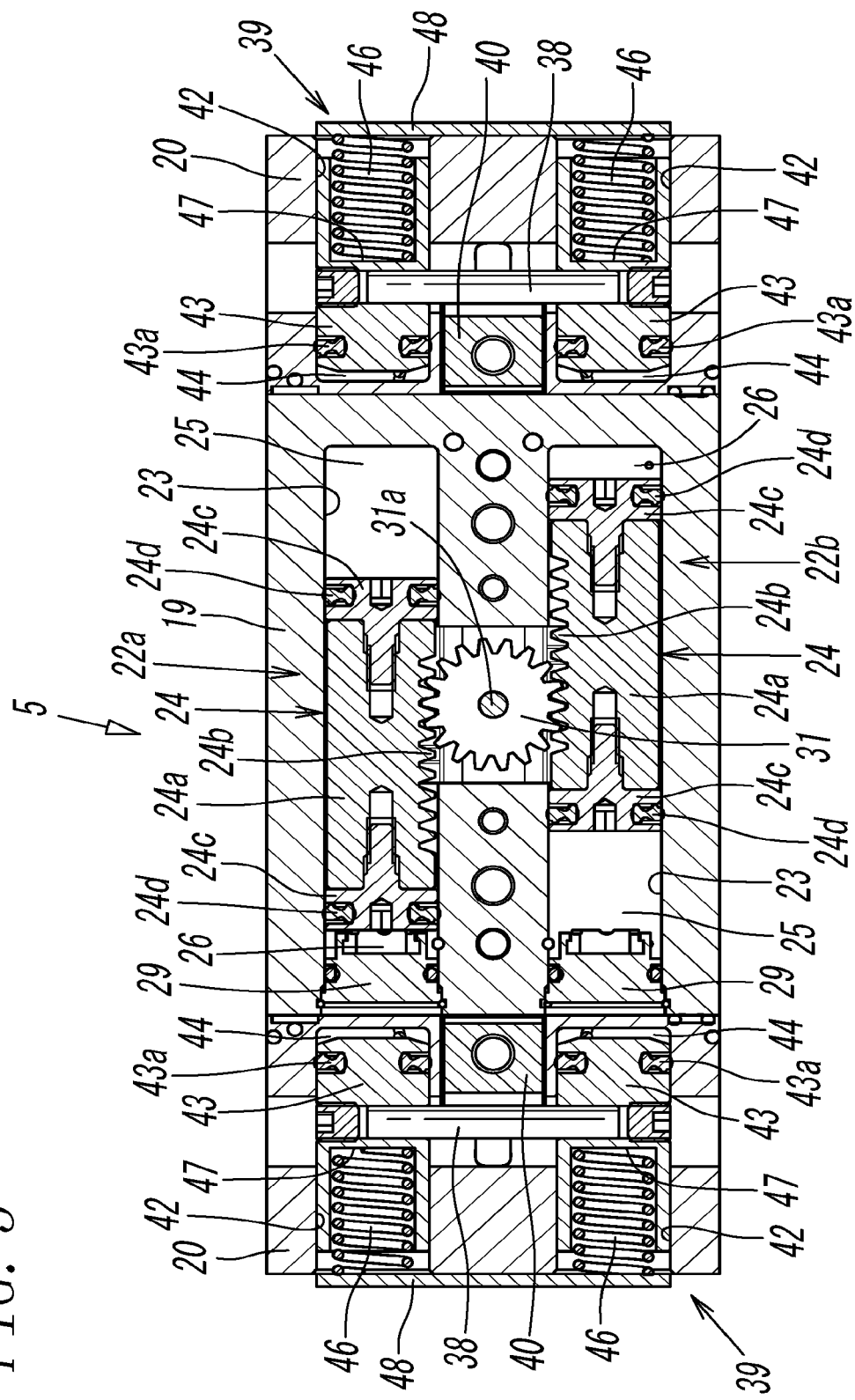
FIG. 5 is a sectional view of the operation unit illustrated in FIG. 4 when the operation unit is cut horizontally.

Note that the members that are denoted by reference sign 29 in FIG. 5 are plugs that block open ends of the cylinder holes 23.

Each of the operation pistons 24 includes a rack portion 24a that has a plurality of teeth 24b formed on a side surface thereof and seal portions 24c that are arranged at the two ends of the rack portion 24a, and packing members 24d are attached to the seal portions 24c. The engagement grooves 30 with which the engagement protrusions 12 of the arms 11a and 11b engage are formed at the center of the top surfaces of the rack portions 24a. In addition, the teeth 24b of the rack portions 24a mesh with a pinion 31 that is disposed at the center of the main body 19.

The pinion 31 causes the pair of operation pistons 24 and 24 to synchronously move in opposite directions and is disposed in a recessed pinion chamber 32, which is formed in the main body 19, such that the pinion 31 is rotatable about a shaft 31a extending perpendicularly to the central axes of the cylinder holes 23, and an upper portion of the pinion 31 is covered with a pinion cover 33 that has a rectangular shape. The two ends of the pinion cover 33 are fixed to the main body 19 with screws 34.

Figure 4:
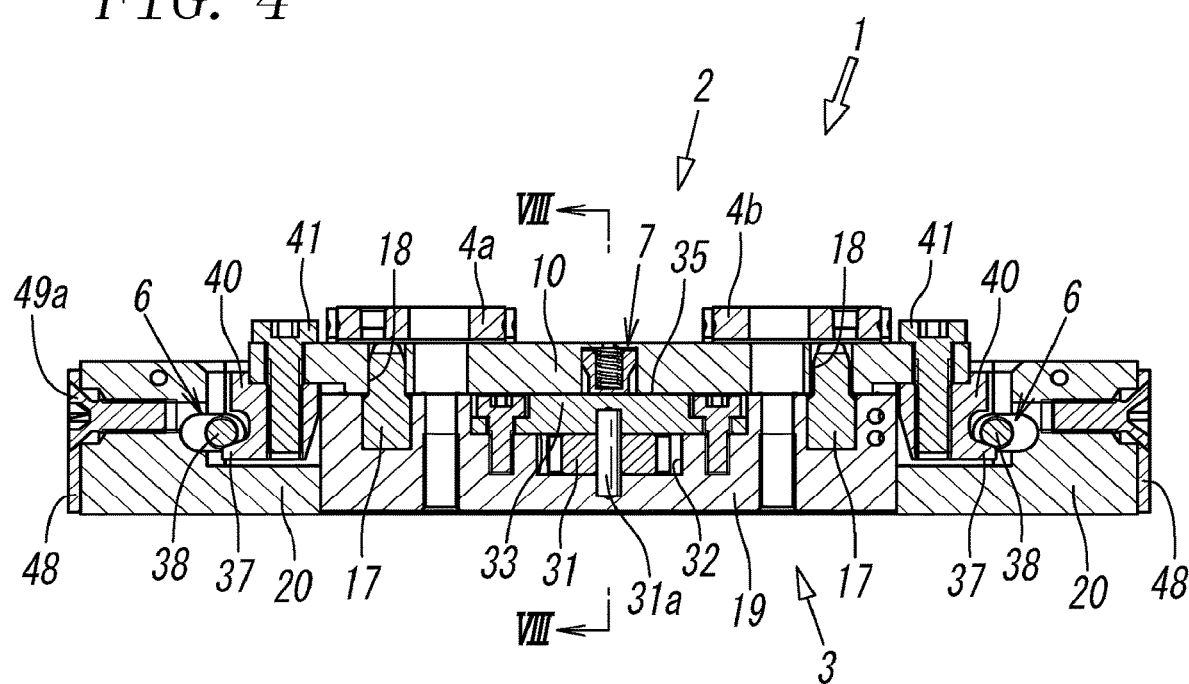
FIG. 4 is a sectional view of the air chuck illustrated in FIG. 1 when the air chuck is cut longitudinally at its center.

FIG. 5 illustrates a state where the pair of operation pistons 24 and 24 have been moved, in the operation unit 3, to first positions on the first end side in the axial direction of the operation pistons 24 as a result of air being supplied to the first pressure chambers 25 and 25 of the two cylinder devices 22a and 22b through the first port 27 and the second pressure chambers 26 and 26 being open to the atmosphere through the second port 28. In this case, as illustrated in FIG. 1 and FIG. 4, the pair of fingers 4a and 4b have been moved to full open positions at which the distance between the pair of fingers 4a and 4b is maximum, and no workpiece is clamped between the attachments attached to the fingers 4a and 4b.

From this state, when the first pressure chambers 25 and 25 are open to the atmosphere through the first port 27 and the air is supplied to the second pressure chambers 26 and 26 through the second port 28, the pair of operation pistons 24 and 24 synchronously move toward second positions on the second end side in the axial direction, the second positions being opposite to the first positions illustrated in FIG. 5. Thus, the pair of fingers 4a and 4b move toward full closed positions at which the distance between the pair of fingers 4a and 4b is minimum, and along with this movement, a workpiece is chucked between the attachments attached to the pair of fingers 4a and 4b.

Next, the connection mechanisms 6 and 6 that connect the chuck unit 2 and the operating unit 3 to each other such that the chuck unit 2 is freely attachable and detachable to and from the operating unit 3 will be described. One of the two connection mechanisms 6 and 6 connects a first end of the chuck unit 2 and a first end of the operation unit 3 to each other, and the other of the two connection mechanisms 6 and 6 connects a second end of the chuck unit 2 and a second end of the operation unit 3 to each other. Although the two connection mechanisms 6 and 6 are arranged in such a manner as to be oriented in opposite directions, the connection mechanisms 6 and 6 have substantially the same configuration, and each of the connection mechanisms 6 has a configuration such as that described below.

In other words, as illustrated in FIG. 3 to FIG. 7, each of the connection mechanisms 6 includes a connection hook 37 that is provided so as to be fixed to the chuck unit 2, a connection pin 38 that is provided in the operation unit 3 so as to be capable of being freely displaced, and a pin operating mechanism 39 that operates the connection pin 38 such that the connection pin 38 engages with or disengages from the connection hook 37.

Each of the connection hooks 37 is formed on one of hook members 40 that are attached to the ends of the support member 10. The hook members 40 are members each having a width equal to the width of the support member 10 and are fixed to the bottom surface of the support member 10 with bolts 41, and each of the hook members 40 is fitted in one of recesses 20a that are formed in their respective auxiliary bodies 20 of the operation unit 3. Each of the connection hooks 37 is formed on a lower end portion of the corresponding hook member 40 so as to project outward in the lengthwise direction of the support member 10, and each of the connection pins 38 engages with the top surface of the corresponding connection hook 37.

Each of the connection pins 38 is provided in one of the auxiliary bodies 20, and each of the pin operating mechanisms 39 is provided in one of the auxiliary bodies 20. Each of the pin operating mechanisms 39 has two piston holes 42 and 42 that are formed in the corresponding auxiliary body 20 so as to be parallel to each other, and includes connection pistons 43 each of which has a round bar shape and each of which is slidably accommodated in one of the piston holes 42 with a seal member 43a interposed between the connection piston 43 and the piston hole 42. In addition, each of the pin operating mechanisms 39 has separation pressure chambers 44 each of which is formed on a first end side of one of the connection pistons 43 and includes coil-shaped connection springs 46 each of which is disposed on a second end side of one of the connection pistons 43. The pin operating mechanisms 39 have a separation port 45 that is used for supplying the air to the separation pressure chambers 44.

In each of the pin operating mechanisms 39, the two piston holes 42 and 42 are formed at positions that sandwich the recess 20a (i.e., the connection hook 37) and extend in the lengthwise direction of the chuck body 15.

Each of the separation pressure chambers 44 is formed between an inward end (the end facing the main body 19) of one of the connection pistons 43 and the bottom of the corresponding piston hole 42. The separation port 45 is formed in the side surface of the main body 19, and the separation port 45 and the separation pressure chambers 44 and 44, which are formed at the ends of the two connection pistons 43 and 43, communicate with each other through communication holes (not illustrated) that are formed in the main body 19 and in the auxiliary bodies 20.

The connection springs 46 are arranged in a compressed state between the bottoms of spring accommodating holes 47 that are formed in outward ends of the connection pistons 43 and an end plate 48 that is attached to the auxiliary bodies 20 with a plurality of screws 49a and 49b.

In addition, the connection pin 38 is disposed between the two connection pistons 43 and 43 so as to extend in a direction that is perpendicular to a direction in which the connection pistons 43 and 43 operate, and a first end and a second end of the connection pin 38 are respectively supported by the two connection pistons 43 and 43. One of the connection hooks 37 engages with an intermediate portion of the connection pin 38.

Figure 6:
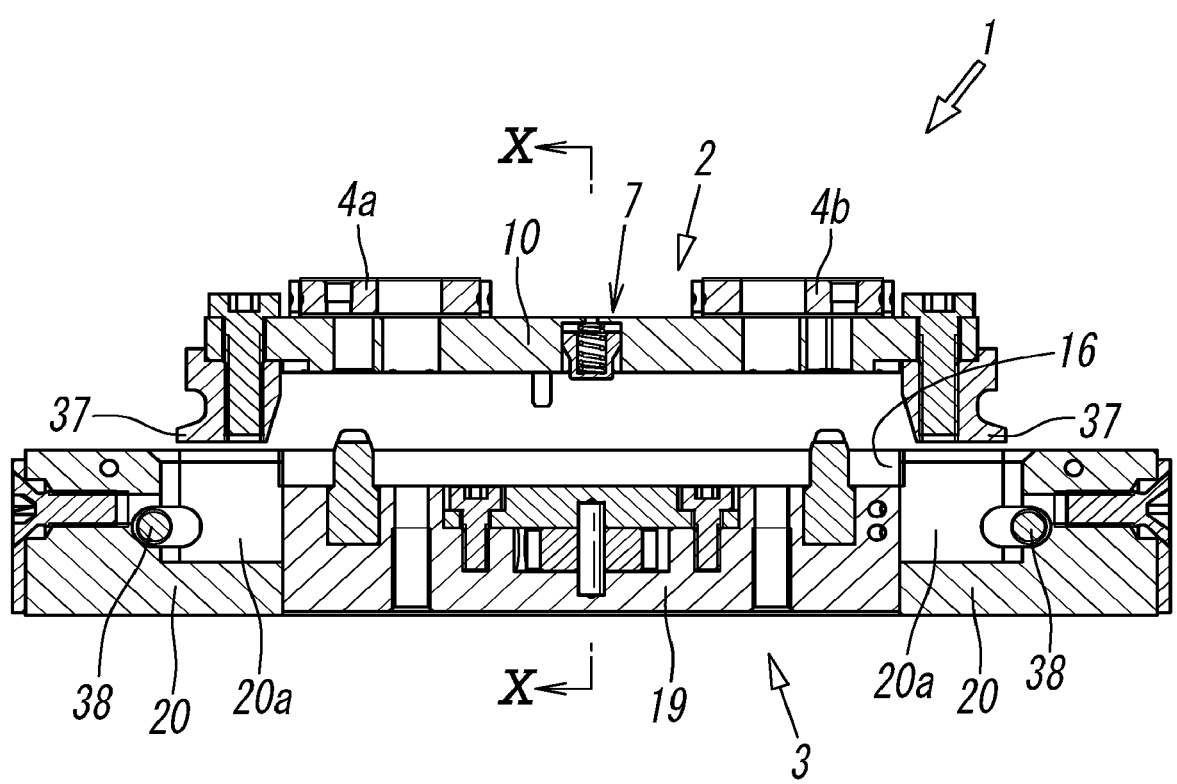
FIG. 6 is a sectional view of the air chuck illustrated in FIG. 2 when the air chuck is cut longitudinally at its center.
Figure 7:
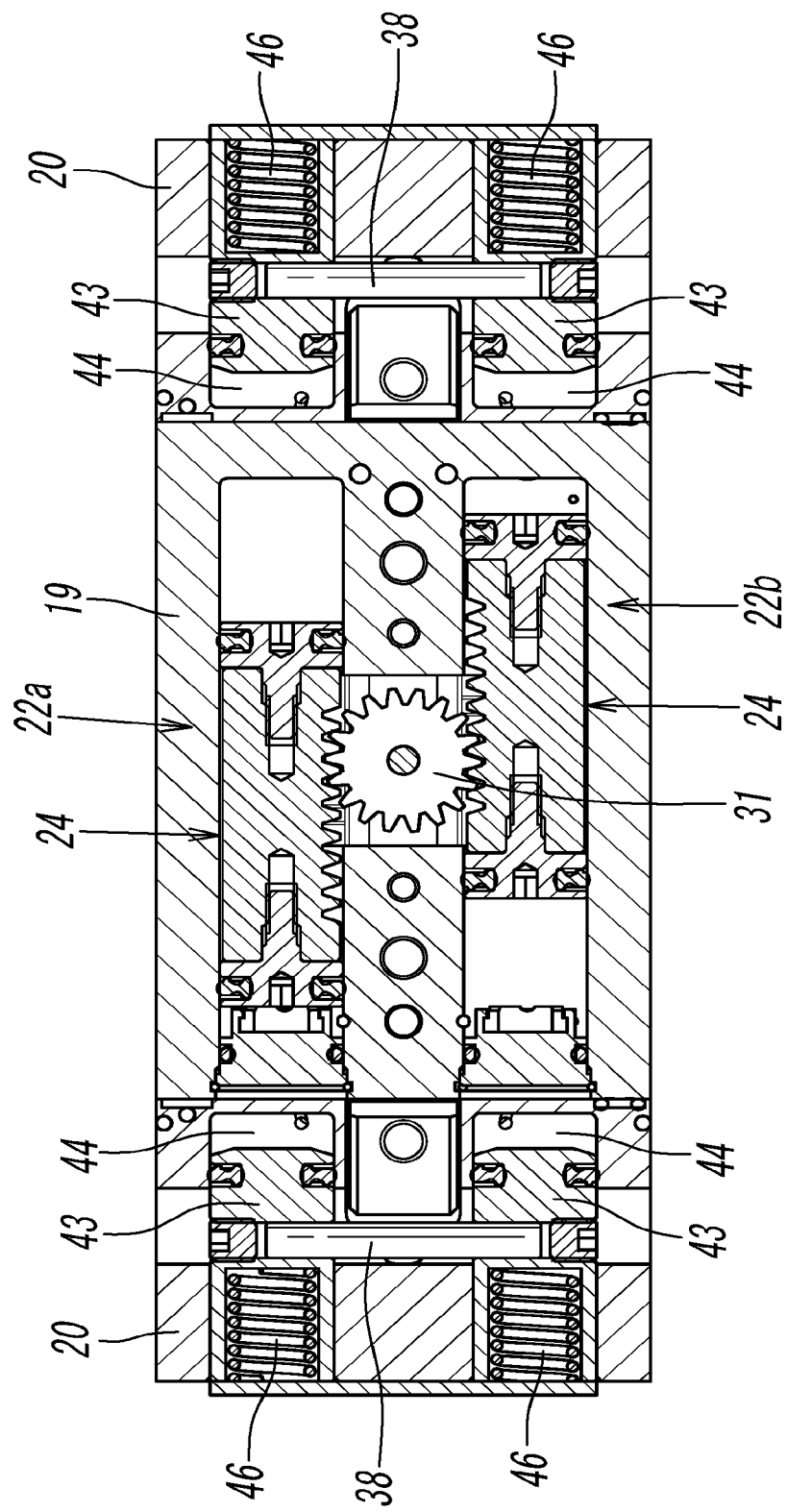
FIG. 7 is a sectional view of the operation unit illustrated in FIG. 6 when the operation unit is cut horizontally.

When the chuck unit 2 and the operation unit 3, which are separated from each other, are connected to each other by the connection mechanisms 6 and 6, as illustrated in FIG. 6 and FIG. 7, the air is supplied to the separation pressure chambers 44 through the separation port 45 (see FIG. 1), so that the connection pistons 43 and 43 and the connection pin 38 are moved rearward to separation positions, and in this state, the chuck unit 2 is fitted into the recess 16, which is formed in the top surface of the operation unit 3, from the above. After that, the air in the separation pressure chambers 44 is discharged through the separation port 45. As a result, as illustrated in FIG. 4 and FIG. 5, the connection pistons 43 and 43 are pushed by the connection springs 46 so as to move forward to connection positions, and along with their movements, the connection pin 38 also moves forward and engages with the corresponding connection hook 37, so that the chuck unit 2 and the operation unit 3 are connected to each other. In this state, the chuck unit 2 cannot be detached from the operation unit 3.

When the chuck unit 2 is detached from the operation unit 3, the air is supplied to the separation pressure chambers 44 through the separation port 45. As a result, as illustrated in FIG. 6 and FIG. 7, the connection pistons 43 and 43 compress the connection springs 46 and move rearward to the separation positions, and the connection pin 38 also moves rearward together with the connection pistons 43 and 43, so that the connection pin 38 disengages from the connection hook 37. Thus, the chuck unit 2 can be moved upward and detached from the operation unit 3.

Next, the locking mechanism 7 will be described. As illustrated in FIG. 3, FIG. 4, FIG. 6, and FIG. 8 to FIG. 11, the locking mechanism 7 is disposed on a center portion of the support member 10 of the chuck unit 2 in the lengthwise direction of the support member 10 and includes a cylindrical plunger 50, a coil-shaped locking spring 51, and two engagement members 52 that are formed of steel balls. In other words, as illustrated in detail in FIG. 8 to FIG. 11, the bottom surface of the center portion of the support member 10 has a circular accommodating hole 53 that is formed so as to be open to the bottom surface, and the plunger 50 and the locking spring 51 are accommodated in the accommodating hole 53. Each of the engagement members 52 is attached to a side surface of the accommodating hole 53.

The outer peripheral surface of the plunger 50 has a conical tapered surface 50a that is gradually tapered toward its end and is accommodated in the accommodating hole 53 such that the end of the plunger 50 comes out of and retracts into the accommodating hole 53.

In addition, the locking spring 51 is disposed between the bottom of a spring accommodating hole 54 that is formed in the plunger 50 and the bottom of the accommodating hole 53, so that the locking spring 51 elastically pushes the plunger 50 continuously in a direction in which the end of the plunger 50 comes out of the accommodating hole 53.

Furthermore, a pair of retaining holes 55 are formed at positions that oppose each other in the diametrical direction of the accommodating hole 53 so as to be open to the two side surfaces of the support member 10, and each of the engagement members 52 is accommodated in one of the retaining holes 55 so as to be capable of being freely displaced between a position (engagement position) where a portion of the engagement member 52 projects outward from the corresponding side surface of the support member 10 and a position (non-engagement position) where the engagement member 52 does not project outward from the corresponding side surface of the support member 10.

Figure 8:
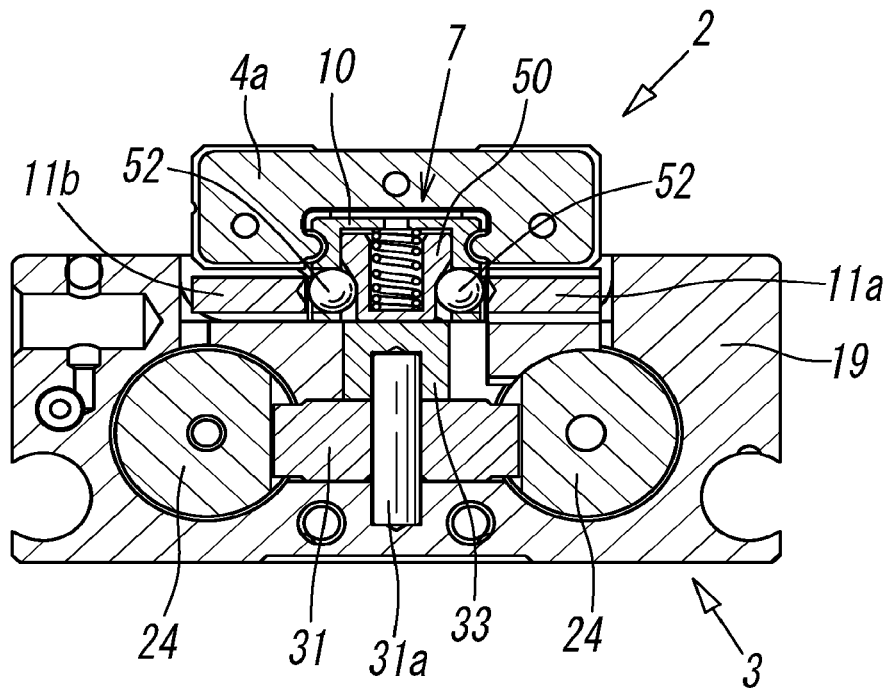
FIG. 8 is an enlarged cross-sectional view taken along line VIII-VIII of FIG. 4.
Figure 9:
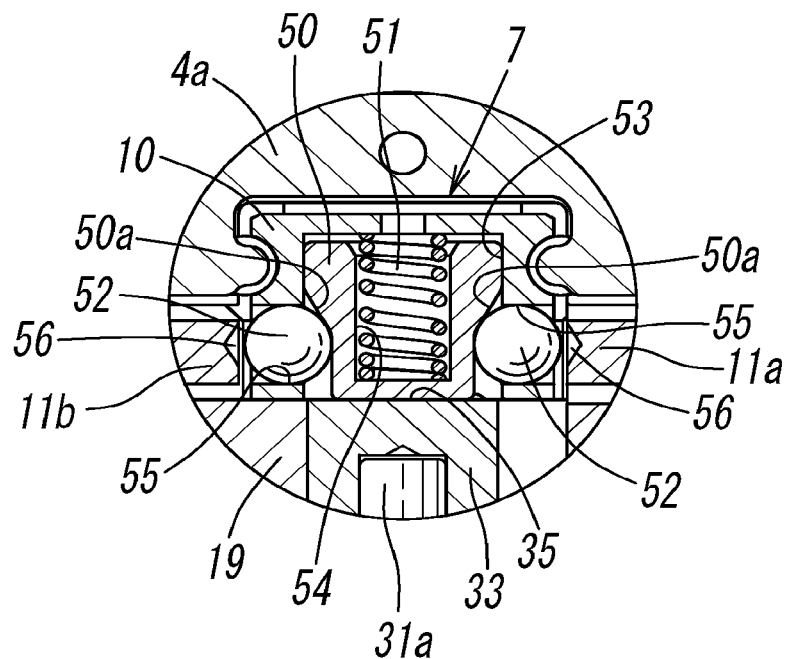
FIG. 9 is an enlarged view of a principal portion of FIG. 8.

As illustrated in FIG. 8 and FIG. 9, in the locking mechanism 7, in a state where the chuck unit 2 is attached to the top surface of the body, the end of the plunger 50 is in contact with a contact surface 35, which is included in the top surface of the main body 19, and pushed by the contact surface 35, so that the plunger 50 is retracted to a position (non-locking position) where the end thereof does not come out of the accommodating hole 53. In this case, the engagement members 52 are not pushed by the tapered surface 50a of the plunger 50, and thus, the engagement members 52 are displaced to the non-engagement positions and are spaced apart from conical engagement recesses 56 that are formed in side surfaces of the arms 11a and 11b, which are respectively continuous with the pair of fingers 4a and 4b. Consequently, the pair of fingers 4a and 4b are in a free state without being locked and can be opened and closed in order to chuck a workpiece.

Note that the contact surface 35 is formed of the top surface of the pinion cover 33.

Figure 10:
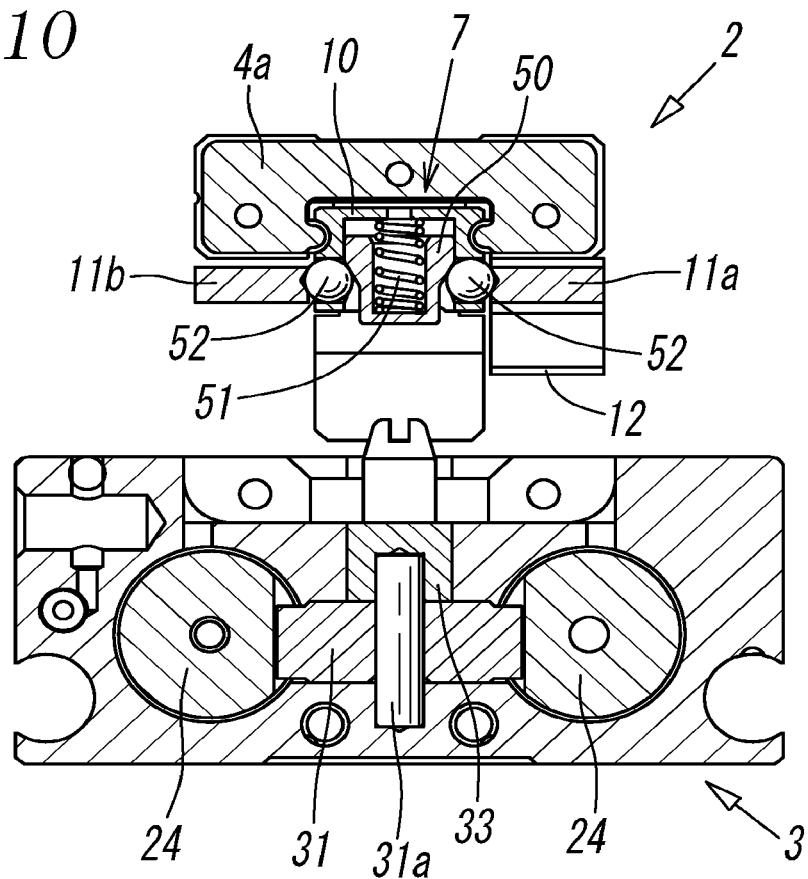
FIG. 10 is an enlarged cross-sectional view taken along line X-X of FIG. 6.
Figure 11:
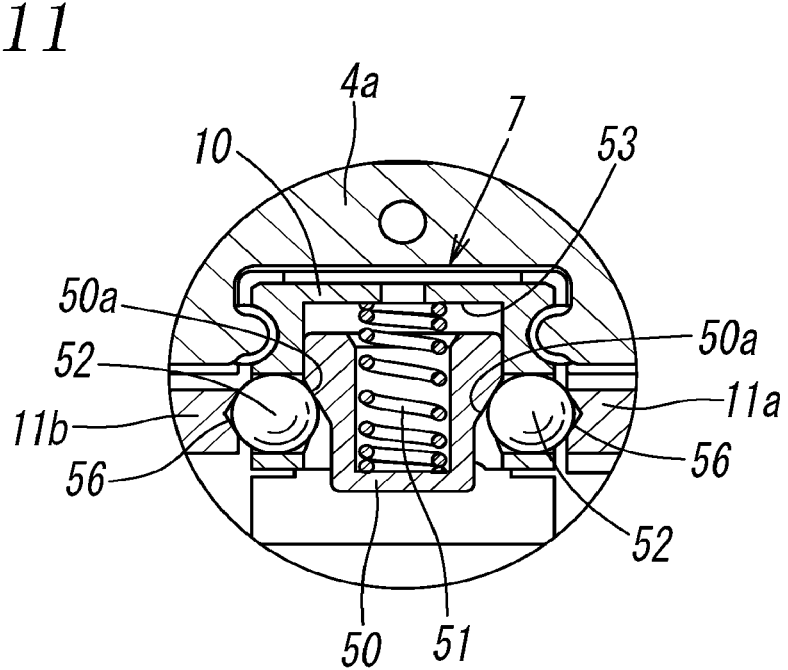
FIG. 11 is an enlarged view of a principal portion of FIG. 10.

From this state, the two cylinder devices 22a and 22b displace the pair of fingers 4a and 4b to the full open positions so as to cause the engagement recesses 56 formed in the side surfaces of the arms 11a and 11b to face their respective engagement members 52. In this state, as illustrated in FIG. 10 and FIG. 11, when the chuck unit 2 is detached from the operation unit 3, the plunger 50 is pushed by the locking spring 51 and displaced to a position (locking position) where the end of the plunger 50 comes out of the accommodating hole 53. In response to the displacement of the plunger 50, the engagement members 52 are pushed by the tapered surface 50a of the plunger 50 so as to be displaced to the engagement positions and engage with the engagement recesses 56 formed in the side surfaces of the arms 11a and 11b. As a result, the pair of fingers 4a and 4b and the support member 10 engage with each other via the engagement members 52, and thus, the pair of fingers 4a and 4b are locked in the full open positions so as not to be able to be opened or closed.

Accordingly, the engagement recesses 56 are formed at positions in the arms 11a and 11b where the engagement recesses 56 face their respective engagement members 52 when the pair of fingers 4a and 4b are displaced to the full open positions.

The pair of fingers 4a and 4b may be locked in the full closed positions by the locking mechanism 7. In this case, the engagement recesses 56 are formed at positions in the arms 11a and 11b where the engagement recesses 56 face the engagement members 52 when the pair of fingers 4a and 4b are displaced to the full closed positions.

In addition, when the chuck unit 2 or a different chuck unit that includes a locking mechanism similar to the locking mechanism 7 of the chuck unit 2 is attached to the operation unit 3, as illustrated in FIG. 8 and FIG. 9, the end of the plunger 50 is pushed by the contact surface 35 of the body, so that the plunger 50 is retracted to the non-locking position. Thus, the engagement members 52 are released from the pressing force applied by the plunger 50 and displaced to the non-engagement positions, and the arms 11a and 11b, that is, the fingers 4a and 4b, are brought into a non-locking state. Consequently, the pair of fingers 4a and 4b become capable of being freely opened and closed.

As described above, in the air chuck 1, when the chuck unit 2 is detached from the operation unit 3, the pair of fingers 4a and 4b are locked in fixed positions by the locking mechanism 7, and thus, attachment and detachment of the chuck unit 2 and replacement of the chuck unit 2 can be easily performed. In particular, in the case of automatically replacing the chuck unit 2 by using a robot or the like, it is not necessary to adjust the positions of the pair of fingers 4a and 4b in accordance with the operation mechanism 5, and thus, a mechanism for such an adjustment, a mechanism for maintaining the fingers 4a and 4b in a state after being adjusted, or the like does not need to be provided.

Figure 12:
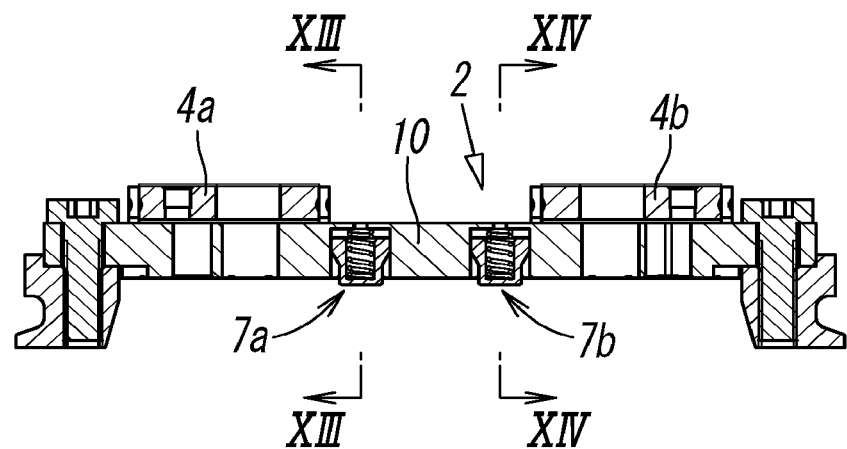
FIG. 12 is a side view of a chuck unit of an air chuck according to a second embodiment of the present invention.

In the first embodiment, the single locking mechanism 7 is provided at the center of the support member 10 in the lengthwise direction, and the pair of fingers 4a and 4b are locked by the single locking mechanism 7. However, as illustrated in FIG. 12, two locking mechanisms 7a and 7b may be provided on the support member 10 in such a manner that the first finger 4a and the second finger 4b are respectively locked by the first locking mechanism 7a and the second locking mechanism 7b.

Figure 13:
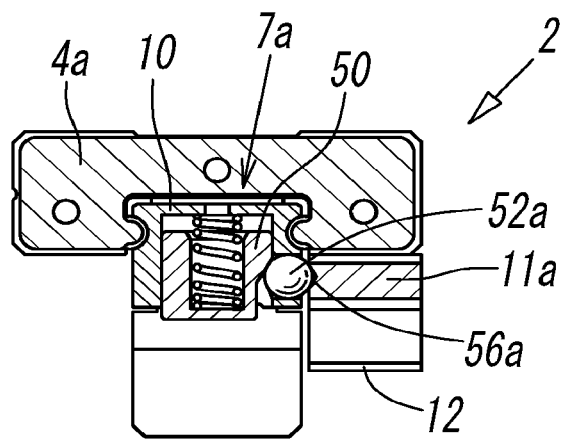
FIG. 13 is an enlarged cross-sectional view taken along line XIII-XIII of FIG. 12.
Figure 14:
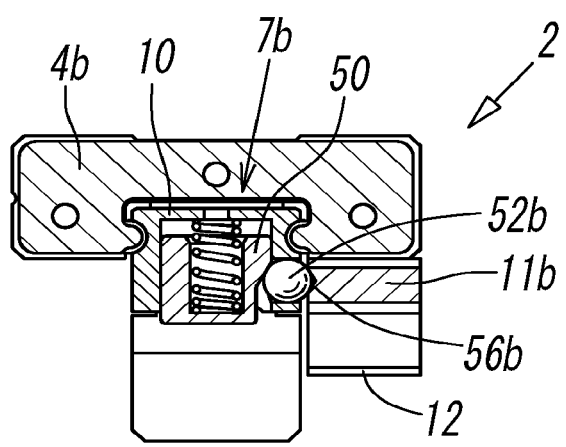
FIG. 14 is an enlarged cross-sectional view taken along line XIV-XIV of FIG. 12.

In this case, the first locking mechanism 7a is disposed at a position between the center of the support member 10 and the first finger 4a, and the second locking mechanism 7b is disposed at a position between the center of the support member 10 and the second finger 4b. In addition, as illustrated in FIG. 13 and FIG. 14, the first locking mechanism 7a includes a single engagement member 52a, and the second locking mechanism 7b includes a single engagement member 52b. The engagement member 52a of the first locking mechanism 7a engages with an engagement recess 56a of the first finger 4a, and the engagement member 52b of the second locking mechanism 7b engages with an engagement recess 56b of the second finger 4b.

REFERENCE SIGNS LIST

1 air chuck
2 chuck unit
3 operation unit
4a, 4b finger
5 operation mechanism
6 connection mechanism
7, 7a, 7b locking mechanism
10 support member
11a, 11b arm
37 connection hook
38 connection pin
39 pin operating mechanism
43 connection piston
44 separation pressure chamber
45 separation port
46 connection spring
50 plunger
50a tapered surface
51 locking spring
52, 52a, 52b engagement member
53 accommodating hole
55 retaining hole
56, 56a, 56b engagement recess

The invention claimed is:

1. An air chuck comprising:
a chuck unit including a pair of fingers that are capable of being freely opened and closed;
an operation unit including an operation mechanism that opens and closes the pair of fingers;
at least one connection mechanism for attaching the chuck unit to the operation unit such that the chuck unit is freely attachable and detachable to and from the operating unit; and
at least one locking mechanism that locks the pair of fingers such that the pair of fingers are capable of being freely opened and closed when the chuck unit is attached to the operation unit and such that the pair of fingers are not able to be opened or closed when the chuck unit is detached from the operation unit.

2. The air chuck according to claim 1,
wherein the locking mechanism includes a plunger, a locking spring, and an engagement member,
wherein the plunger is displaced to a locking position by being pushed by the locking spring when the chuck unit is detached from the operation unit and is displaced to a non-locking position by being pushed by the operation unit when the chuck unit is attached to the operation unit, and
wherein, when the plunger is displaced to the locking position, the engagement member is pushed by the plunger and engages with the pair of fingers so as to lock the pair of fingers, and when the plunger is displaced to the non-locking position, the engagement member is released from a pressing force applied by the plunger and brings the pair of fingers into a non-locking state.

3. The air chuck according to claim 2,
wherein the chuck unit includes a support member that supports the pair of fingers, and the plunger and the locking spring are accommodated in an accommodating hole that is formed in the support member, wherein a retaining hole is formed in a hole wall of the accommodating hole in such a manner as to be open to at least one of side surfaces of the support member, and the engagement member that has a spherical shape is accommodated in the retaining hole in such a manner as to be capable of being freely displaced between an engagement position at which the engagement member engages with the fingers and a non-engagement position at which the engagement member does not engage with the fingers, and wherein the plunger has a tapered surface, and the tapered surface pushes the engagement member so as to displace the engagement member to the engagement position when the plunger is displaced to the locking position and moves away from the engagement member such that the engagement member becomes capable of being freely displaced to the non-engagement position when the plunger is displaced to the non-locking position.

4. The air chuck according to claim 3, wherein one of the pair of fingers and another one of the pair of fingers respectively include an arm extending along one of the side surfaces of the support member and an arm extending along another one of the side surfaces of the support member, and the arm of the one finger and the arm of the other finger each have an engagement recess with which the engagement member engages at the engagement position.

5. The air chuck according to claim 3, wherein the locking mechanism is disposed on the support member, and the locking mechanism includes a pair of engagement members one of which engages with one of the fingers and another one of which engages with another one of the fingers.

6. The air chuck according to claim 3, wherein a plurality of the locking mechanisms are arranged on the support member, and one of the locking mechanisms locks one of the fingers and another one of the locking mechanisms locks another one of the fingers.

7. The air chuck according to claim 1, wherein the locking mechanism locks the pair of fingers in full open positions or full closed positions.

8. The air chuck according to claim 1, wherein a plurality of the connection mechanisms are provided such that one of the connection mechanisms connects a first end of the chuck unit and a first end of the operation unit to each other and such that another one of the connection mechanisms connects a second end of the chuck unit and a second end of the operation unit to each other, wherein each of the connection mechanisms includes a connection hook that is provided in such a manner as to be fixed to an end portion of the chuck unit, a connection pin that is provided in an end portion of the operation unit so as to be capable of being freely displaced and that engages and disengages with and from the connection hook, and a pin operating mechanism that operates the connection pin, and wherein each of the pin operating mechanisms includes a connection piston that holds the connection pin, a separation pressure chamber for moving the connection piston in a direction in which the connection pin disengages from the connection hook, a separation port that communicates with the separation pressure chamber, and a connection spring for moving the connection piston in a direction in which the connection pin engages with the connection hook.

9. The air chuck according to claim 8, wherein each of the pin operating mechanisms includes two connection pistons that are arranged side by side, and a first end and a second end of the connection pin are supported by the two connection pistons.

* * * * *